United States Patent
Chase et al.

(10) Patent No.: US 9,255,593 B2
(45) Date of Patent: Feb. 9, 2016

(54) STAGING ASSEMBLY

(71) Applicants: Jonathan M. Chase, Shoreview, MN (US); Christoper J. Altringer, Columbus, MN (US)

(72) Inventors: Jonathan M. Chase, Shoreview, MN (US); Christoper J. Altringer, Columbus, MN (US)

(73) Assignee: STAGING CONCEPTS ACQUISITIONS, LLC, Minneapolis, MN (US)

( * ) Notice: Subject to any disclaimer, the term of this patent is extended or adjusted under 35 U.S.C. 154(b) by 440 days.

(21) Appl. No.: 13/660,517

(22) Filed: Oct. 25, 2012

(65) Prior Publication Data

US 2013/0101343 A1    Apr. 25, 2013

Related U.S. Application Data

(60) Provisional application No. 61/551,255, filed on Oct. 25, 2011.

(51) Int. Cl.
*E04H 3/28* (2006.01)
*F16B 12/02* (2006.01)
*E04H 3/24* (2006.01)

(52) U.S. Cl.
CPC *F16B 12/02* (2013.01); *E04H 3/24* (2013.01); *Y10T 29/49947* (2015.01); *Y10T 403/595* (2015.01); *Y10T 403/602* (2015.01)

(58) Field of Classification Search
CPC .............. A47B 2013/022; A47B 2200/0034; F16B 2012/446; E04H 3/24; E04H 3/28; Y10T 403/598; Y10T 403/599; Y10T 403/60; Y10T 403/602; Y10T 403/604
See application file for complete search history.

(56) References Cited

U.S. PATENT DOCUMENTS

| 1,954,048 | A | * | 4/1934 | Jeffrey et al. | 279/78 |
|---|---|---|---|---|---|
| 4,845,915 | A | * | 7/1989 | Rogers et al. | 52/782.1 |
| 5,323,563 | A | * | 6/1994 | Rogers et al. | 52/7 |
| 7,703,401 | B2 | | 4/2010 | Davis et al. | |
| 7,922,416 | B2 | | 4/2011 | Davis et al. | |
| 8,136,460 | B2 | | 3/2012 | Tait et al. | |
| 8,793,876 | B2 | | 8/2014 | Davis et al. | |
| 2009/0301359 | A1 | * | 12/2009 | Tait et al. | 108/56.3 |

FOREIGN PATENT DOCUMENTS

| DE | 199 11 380 | * | 9/2000 | E04G 7/30 |
|---|---|---|---|---|
| DE | 10 2006 004 176 | * | 8/2007 | A47B 37/00 |

* cited by examiner

*Primary Examiner* — Michael P Ferguson
(74) *Attorney, Agent, or Firm* — Hollingsworth Davis, LLC

(57) ABSTRACT

An assembly comprises a corner block piece and a locating plate. The corner block piece has a node receiving cavity which includes an aperture configured to receive a locking pin. The locating plate includes at least one locking node. The locking node includes a spring-loaded locking pin configured to engage the aperture when the locking node is inserted in the node receiving cavity. The assembly facilitates construction of a portable staging system involving a platform, at least two support legs, and bracing.

19 Claims, 5 Drawing Sheets

STAGING ASSEMBLY

RELATED APPLICATIONS

This application claims the benefit of provisional patent application Ser. No. 61/551,255, filed on Oct. 25, 2011, to which priority is claimed pursuant to 35 U.S.C. §119(e), and which is hereby incorporated herein by reference.

FIELD OF THE INVENTION

The present invention is directed to portable and modular staging. More particularly, the present invention relates to staging systems for concert and event touring.

BACKGROUND

In order to create an environment in which spectators may each enjoy a largely unobstructed sightline of an event, staging is erected. Such staging may involve constructing a raised platform for conducting the event, raised or tiered seating for the spectators to view the location of the event, or a combination of both. Both staging approaches involve constructing raised platforms and such construction may be temporary or permanent. Typically, the raised platforms are constructed of modular flooring panels elevated on vertical support legs, or other types of understructure, to provide for optional platform configurations. As with most forms of construction, there are several guidelines and safety requirements that the materials and final product must satisfy.

For example, both modular floor panels and vertical supports of a platform modular floor system must meet certain structural performance requirements. More specifically, a floor system must be capable of withstanding loads and stresses within stated limits. Floor panels, for example, must be able to withstand a concentrated load and rolling load of a specified force applied using a square plate to a 7×7 square inch (177.8 mm×177.8 mm) area of the panel at any location on the panel without failure. Failure is the point at which the panel will no longer accept the load. The floor panels must also not exceed a specified permanent deflection after the concentrated load is removed. Floor panels, along with their supporting understructure for example, must be capable of supporting an impact load dropped from a height of 36 inches (914.4 mm) onto a one square inch area (645.16 mm$^2$), using a round or square indentor, at any location on the panel without failure. A vertical support assembly must sustain an axial load without deforming permanently. Another test for a vertical support assembly involves determining the average overturning moment without deformation when the assembly is supported by a clean, sound, uncoated concrete surface.

Floor systems must satisfy other safety guidelines, such as those directed to natural forces (e.g., earthquakes and fires). With respect to earthquakes, for example, access flooring systems must withstand specified lateral seismic forces. A representative standards setting body for such requirements is the International Conference of Building Officials, which publishes building codes, including codes for specific seismic zones. With respect to fire, floor system components with exposed finishes must meet flame spread and smoke development criteria. Other components, such as support system components, may qualify as noncombustible. A representative standards setting body for such requirements is ASTM International (originally known as the America Society for Testing and Materials), which is another international standards organization that develops and publishes voluntary consensus technical standards for a wide range of materials, products, systems, and services.

Thus, to ensure the safety of end users of an infill platform floor system, several structural and safety performance requirements must be satisfied. These must be met while also providing a system that is durable and convenient to work with, e.g., modular, lightweight, and portable. Common stage systems that include portable components typically require a tedious erection over a long duration with many bulky and heavy components. These systems are typically constructed in their final positions by first erecting the support system and then installing the platforms. The platforms typically attach to the support system with a manual locking system to prevent movement of the platforms once in place. Additional parts, hardware, and tools are commonly required to erect these support systems and platforms. These systems may be particularly useful with respect to sporting event venues, concerts, ceremonies, worship facilities, and performing arts venues.

SUMMARY

Embodiments of the present invention provide an alternative to complex and time consuming installations of current staging systems. The system embodiments described herein can be erected with the use of minimal or no tools and use minimal components. The systems are mobile once erected, allowing the staging systems to be located in a final position post erection.

One embodiment is directed to an assembly comprising a corner block piece and a locating plate. The corner block piece includes a node receiving cavity, and the node receiving cavity includes an aperture configured to receive a locking pin. The locating plate includes at least one locking node. The locking node includes a spring-loaded locking pin configured to engage the aperture when the locking node is inserted in the node receiving cavity.

Another embodiment is directed to a system comprising a platform, a locating plate, a leg support connectable to the locating plate, and at least two braces coupled to the leg support and the platform. The platform includes a frame around the perimeter of an infill panel where the frame includes at least one corner block piece located at a corner of the platform under the infill panel. The corner block piece includes a node receiving cavity having an aperture configured to receive a locking pin. The locating plate includes at least one locking node, where the locking node includes a locking pin configured to engage the aperture when the locking node is inserted in the node receiving cavity.

A further embodiment is directed to a method for assembling a portable stage. Components of the portable stage include four support pieces each of which includes a support leg affixed to a collar of a locating plate, and the locating plate includes at least one locking node and at least one locating node. The locking node includes a locking pin coupled to a release lever. Each of the four support pieces is positioned at a respective corner of a first platform, wherein the first platform includes a corner block at each corner. Next, a locking node of each of the locating plates is inserted into a locking node receiving cavity of the respective corner blocks. Upon insertion of the locking node, the locking pin engages a first aperture in the locking node receiving cavity and the release lever engages a second aperture in the support leg. A first end of at least two braces is then attached to each support leg and the second end of each of the braces is attached to the platform.

These and various other advantages and features of novelty are pointed out with particularity in the claims annexed hereto and form a part hereof. However, for a better understanding of the invention and its advantages, reference should be made to the drawings which form a further part hereof, and to accompanying descriptive matter, in which there are illustrated and described representative examples of apparatuses, systems, and methods in accordance with the invention.

BRIEF DESCRIPTION OF THE DRAWINGS

The invention is described in connection with embodiments illustrated in the following diagrams.

DETAILED DESCRIPTION

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

In accordance with embodiments of the invention, a non-cementitious infill platform floor system includes assemblies of modular floor panels on elevated supports (understructures) forming accessible under floor cavities (air spaces) to accommodate electrical, mechanical, and special effect services, all of which preferably comply with specified performance requirements.

In various embodiments of the present invention, an infill floor system comprises modular and removable non-cementitious filled panels fastened onto, and supported by, portable adjustable height understructures and support legs. The support leg and panel corner design provide a positive location and engagement of the panel to the understructure support system, which allows the panels to be coupled to the support system without the use of fasteners.

The non-cementitious panels may be constructed of a variety of materials; however, one-inch marine grade plywood has been shown to satisfy requisite safety standards. The panels may also be found in a variety of sizes and shapes, although staging panels are commonly rectangular. Depending on their materials and size, panels provided according to some embodiments are removable via the use of a lifting device while others may be maneuvered by one or two adults. Panels may also be interchangeable when in an unmodified state, or when uniformly modified, e.g., cut to the same size.

To facilitate attachment to the understructure support system, a panel is encased in a frame to form a platform. The frame both supports and protects the panel. Further, the frame facilitates attachment of accessory structures. While the frames may be constructed of a variety of materials, aluminum has been shown to have the strength and weight to satisfy applicable safety and construction requirements. For example, an aluminum frame contributes to a lightweight and mobile platform stage assembly. The frame involves a corner block piece for automatically attaching the platform to the support system during installation. Preferably, this automatic attachment also aligns the platforms and avoids the need for a manual operation to prevent the platforms from moving once in place. However, the platform may also include male and female coffin locks for interconnection of multiple platforms and to further eliminate gaps and misalignment of the stage flooring.

Figure 1:
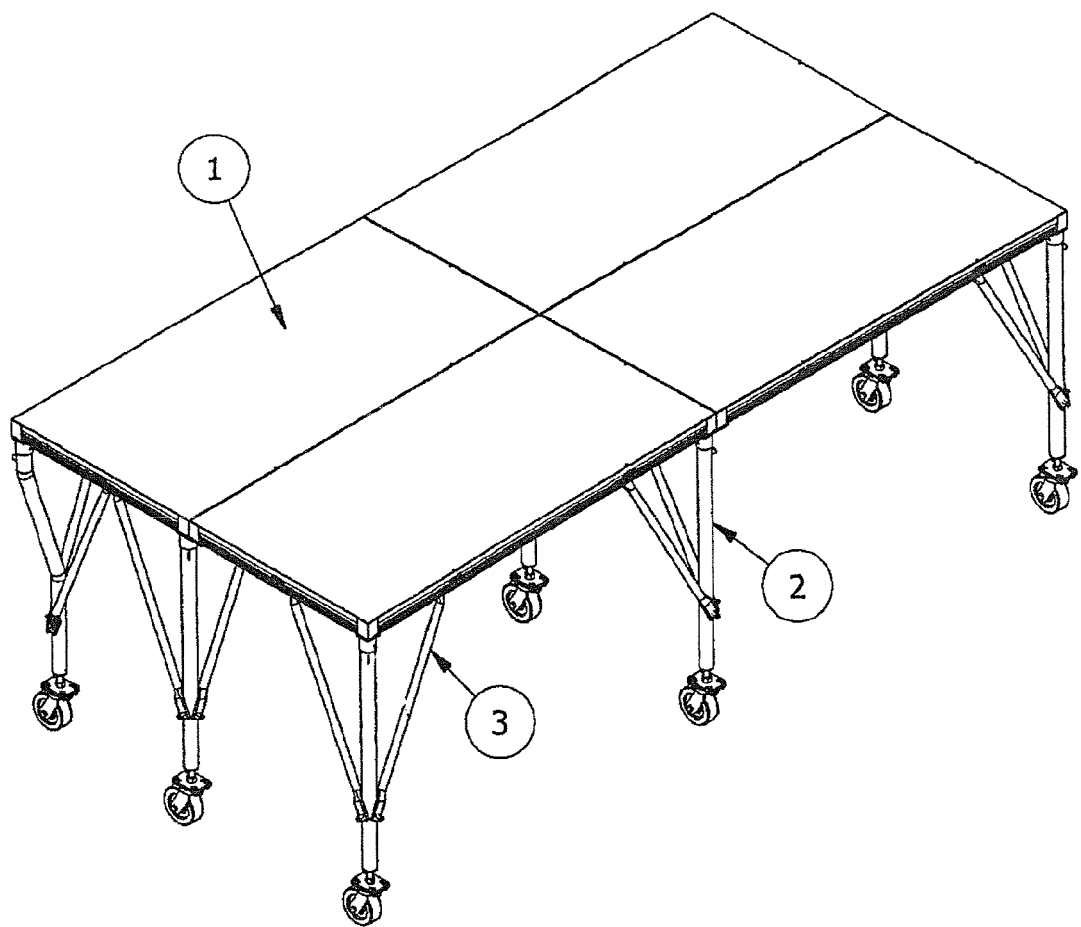
FIG. 1 is an isometric view of a staging system according to embodiments of the invention.

Referring now to FIG. 1, the main elements of a staging system according to various embodiments, include a platform 1, a support leg assembly 2, and braces 3. In FIG. 1, an assembled performance stage comprising four platforms 1, nine support leg assemblies 2, and eighteen braces 3 is illustrated. The four platforms 1 are connected or otherwise coupled at the center with a quad node locating plate, as is discussed further with respect to FIG. 5. The stage of FIG. 1 is illustrated as being movable on locking casters; however, the casters are optional and the support leg assemblies 2 may alternatively use stationary feet or supporting members.

Figure 2:
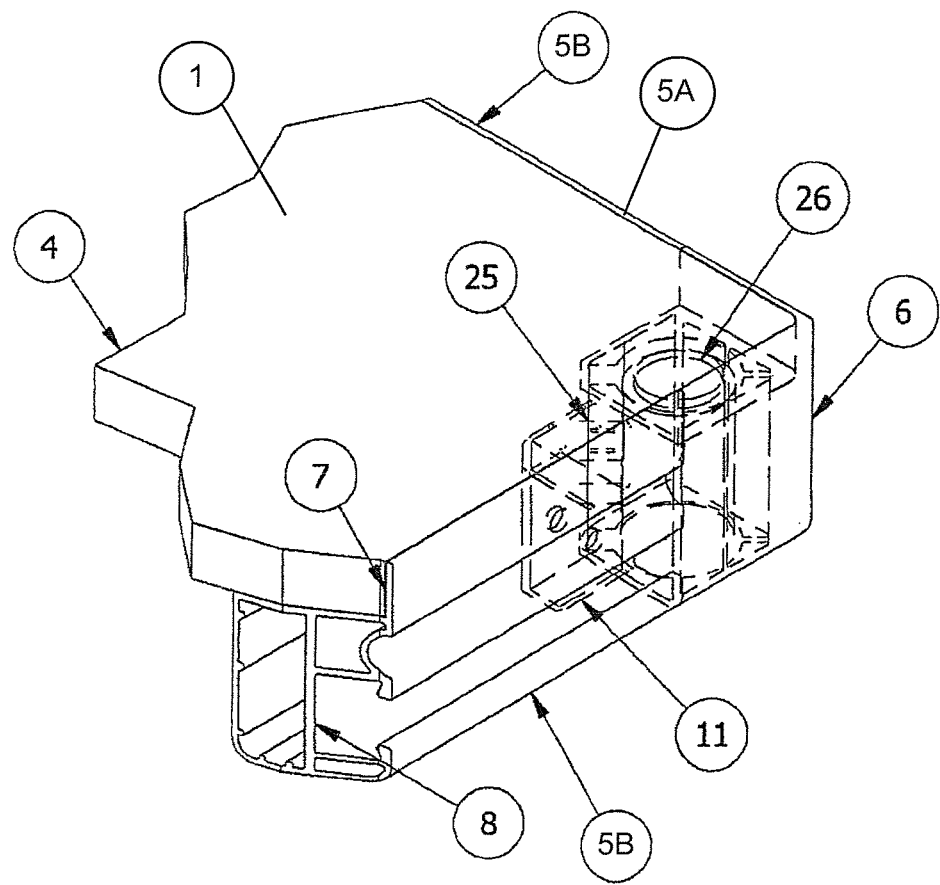
FIG. 2 is an isometric view of a platform corner according to embodiments of the invention.

FIG. 2 illustrates a portion of a platform 1 and, more specifically, a corner block arrangement 6 attached to a frame 5A of the platform 1. The platform 1 includes a non-cementitious infill panel 4 surrounded by frame 5A. For example, the platform 1 may be constructed from a one-inch marine grade plywood panel 4 with an aluminum frame 5A. The frame 5A is shown to include a boxed extrusion 5B and corner block 6. The boxed extrusion 5B runs along the four sides of the platform 1. The extrusion 5B has a lip 7 configured to protect the panel edges and has a generally 'C' shaped groove 8 to accept staging accessories such as guardrail and stair units. Depending on the thickness of the infill panel 4, the lip 7 may be approximately one inch high.

Figure 3:
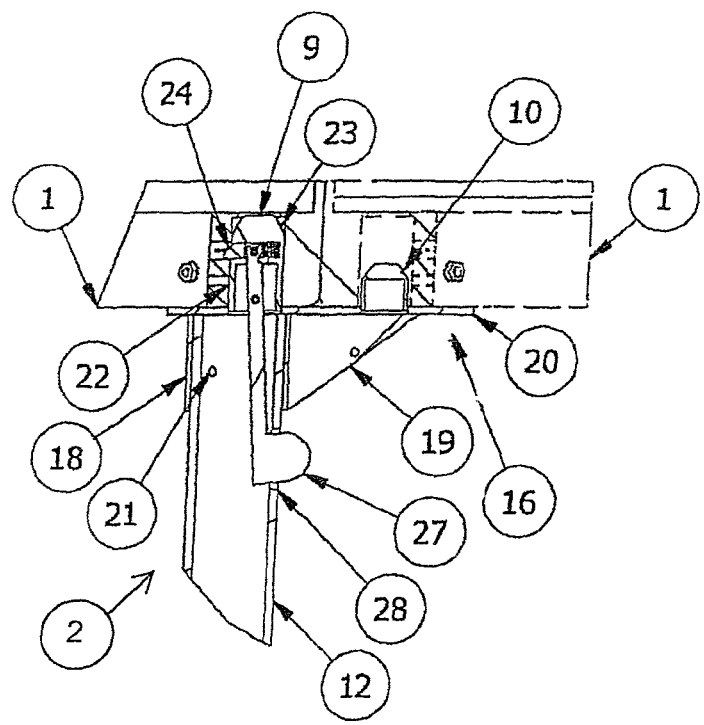
FIG. 3 is a section view illustrating a support leg connection to a platform according to embodiments of the invention.

The corner block 6 is preferably an extruded section, typically of the same material as the frame 5A, having at least one flange 11 that sleeves into the perimeter of boxed extrusion 5B. The corner block 6, as best seen in FIG. 3, attaches the platform 1 to understructure support by accepting a locking node 9 or locating node 10 of a support leg assembly 2. While the term "corner block" is used to describe the location of this attachment feature, the feature may be used with a variety of panel shapes and is not limited to location in a ninety-degree corner location. The platform 1 may include further features for interconnection and stability. For example, each platform 1 may have one or more male and female coffin locks (e.g., three of each) based on the location of the platform 1 in the final staging system. The platform assembly is preferably mechanically constructed (non-welded) and is field repairable.

Figure 4:
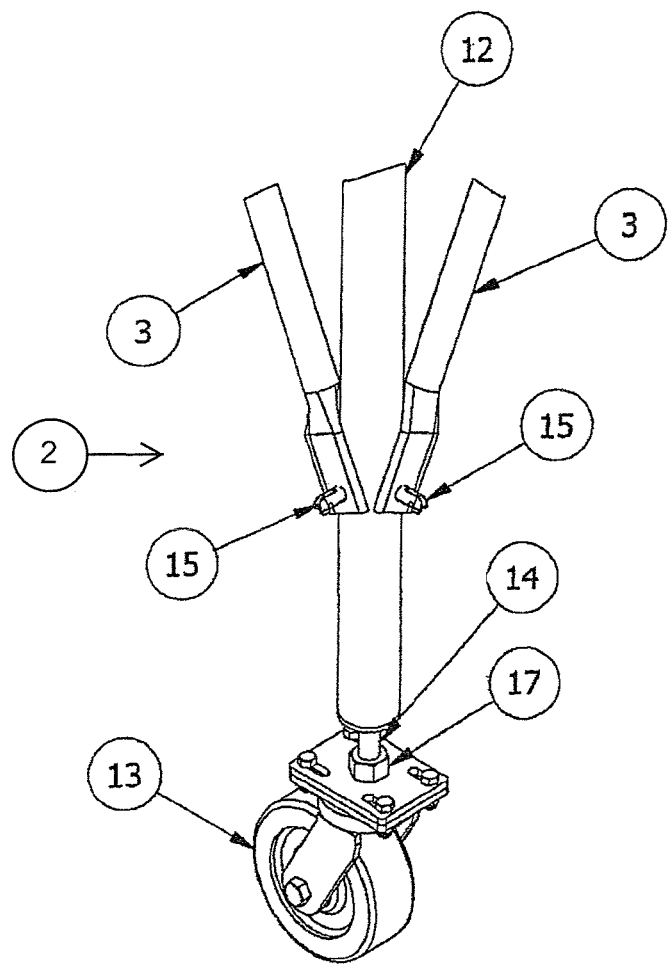
FIG. 4 is an isometric view of a support leg base with bracing according to embodiments of the invention.

FIGS. 3 and 4 illustrate the support leg assembly 2 according to various embodiments. FIG. 3 depicts the upper portion of the support leg 12 that attaches to the platform 1, while FIG. 4 depicts the lower portion of the support leg 12 and the bracing 3. The support leg assembly 2 is comprised of a leg or post 12, a ground support 13, leveling rod 14, bracing pins 15, and a removable locating plate assembly 16. The leg 12 may be constructed of a variety of materials, including, for example, aluminum. The leg 12 is either straight or bent to remain within the stage perimeter and has at least two welded bracing pins 15 orientated at approximately ninety degrees to one another and located at or near the base of the leg 12. One end of the leg 12 is coupled to a ground support 13 which may take many shapes, such as a stationary, flat foot or a high capacity swivel caster. A leveling rod 14 may engage an acme thread. A nut 17 is provided to allow hand leveling of the staging system while allowing the rod 14 to support heavy loads.

Between the leg 12 and the platform 1 is a removable locating plate assembly 16. The locating plate assembly 16 involves a collar 18, at least one gusset plate 19, support plate 20, a locking node 9, and, optionally, one or more locating nodes 10. The locating plate assembly 16 may be made of steel and welded together. The assembly 16 is either a single, dual, or quad node plate dependent on the intended location of the support leg assembly 2 in the staging system. The collar 18 sleeves over the leg 12 and is mechanically fastened thereto (e.g., with at least two bolts 21) to reduce or minimize movement between the leg 12 and the locating plate assembly 16. The support plate 20 transfers the load of the platform 1 to the leg 12. The one or more locating nodes 10 assist in locating a platform (e.g., a corner thereof) on the support plate 20 during erection of the system.

The locking node 9 couples the locating plate assembly 16 to the platform 1. The locking node 9 is comprised of cylindrical rod 22 with a tapered end 23 configured to guide the locking node 9 into the corner block 6 of the platform 1. Within the locking node 9 is a spring-loaded locking pin 24 that automatically plunges into an aperture 25 located in the node receiving cavity 26 of the corner block 6. Attached to the locking pin 24 is a spring-loaded release lever 27 that runs down through the collar 18, into the leg 12, and protrudes out an aperture 28 milled in the leg 12. The release lever 27 is activated by grasping the leg 12, thus pressing the lever 27 flush with the wall of the leg 12 at which point the locking node 9 can be removed from the platform's corner block 6.

Figure 5:
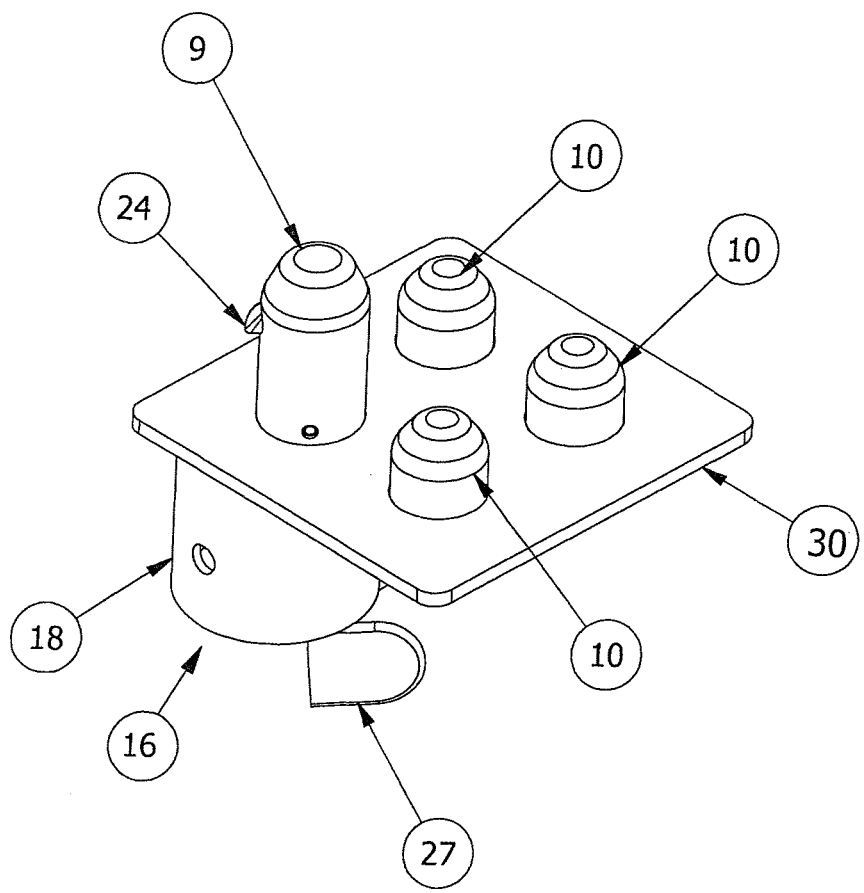
FIG. 5 is an isometric view illustrating a connection piece for multiple platforms according to embodiments of the invention.

With respect to FIG. 5, a quad node locating plate 30 is illustrated. As discussed above, the locating plate assembly 16 may include a single, dual, or quad node plate depending on where the assembly is located in the staging system and thus, determines how many platforms are supported by the assembly 16. The quad node locating plate 30 shown in FIG. 5, for example, is used to align and attach four platforms together as shown in the center of FIG. 1. The quad node locating plate 30 includes one locking node 9 and three locating nodes 10. These may be positioned on the plate 30 in any order necessary (e.g., the locking node 9 may be at any corner of the quad locating plate 30) to connect platforms 1 at the desired location. Similarly, a single node plate would have only a locking node 9 and no locating nodes 10, while a dual node plate would include one locking node 9 and one locating node 10. While the quad node locating plate 30 shown in FIG. 5 is illustrated for use with connecting four rectangular platforms, the quad node locating plate 30 may take a variety of shapes for interconnecting panels of all shapes and sizes. Again, the location at which the plate is to be used determines whether a single, dual, or quad node locating plate is utilized.

As discussed above, assembly of the staging system requires minimal components and tools (or no tools whatsoever). With reference to FIGS. 1-5, the stage system is erected by first inserting support leg assemblies 2 into the node receiving cavities 26 of each of a first platform's corner blocks 6. The locking node 9 will automatically lock to the platform 1 creating a stable assembly when not loaded. With the first platform 1 standing, braces 3 are installed on each support leg 12. The braces 3 span from the base of the support leg 12 to the inside face of the platform's boxed extrusion 5B and are attached thereto (e.g., using bracing pins 15).

With one platform erected, the next platform is placed adjacent to the first platform by locating two corners of the second platform on the locating nodes 10 of two leg assemblies 2 of the first platform (e.g., the leg assemblies of the first platform using at least a dual node locating plate). Locking nodes 9 of two additional leg assemblies 2 are then inserted into the open corner blocks 6 of the second platform, automatically locking in place. Lastly, bracing 3 is installed on the two new leg assemblies 2 and, as needed, on leg assemblies 2 of the first platform 1 that also support the second platform. This process continues until the entire stage is erected. Next, additional support features may be engaged, such as activating coffin lock connectors between platforms, to create a uniform stage surface. Any optional stage accessories may also be attached, and the staging system may be moved into place on its casters 13 to the stage's final location.

It is understood that floor system embodiments of the present invention may be used with various accessories and devices. For example, railings, step units, and other accessories may be suitably arranged at any desirable location on the floor systems. These accessories may be attached to the groove 8 in the boxed extrusion 5B of the frame 5A of the platform 1.

A finished floor system may include various access points, which provide access to the support structure, wiring or mechanics and/or to the sub-floor. In some implementations, additional support structures, such as pedestals, may be installed as needed in order to support panels where a floor is disrupted by columns, walls, and/or cutouts.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

The invention claimed is:

1. An assembly, comprising:
  a corner block having a node receiving cavity, the node receiving cavity having a cylindrical wall comprising an aperture extending therethrough and configured to receive a locking pin;
  a locating plate assembly comprising:
  a locating plate;
  at least one locking node extending from an upper face of the locating plate, the at least one locking node comprising a spring-loaded locking pin extending from an outer surface thereof and configured to engage the aperture when the at least one locking node is inserted in the node receiving cavity, wherein the spring-loaded locking pin includes a release lever attached thereto; and
  a collar coupled to a lower face of the locating plate and configured to receive an upper end of a support leg, the release lever downwardly extending through the locking node and the collar; and
  a support leg received within the collar and comprising a cylindrical member having an open channel defined by a circumferential surface comprising a second aperture extending therethrough, wherein the second aperture is configured to engage the release lever when the at least one locking node is inserted in the node receiving cavity, wherein the release lever is activated by depressing the lever flush within the second aperture to release the locking node from the corner block.

2. The assembly of claim 1, wherein the release lever is configured to be disengaged by hand.

3. The assembly of claim 2, wherein the corner block forms part of a section of staging platform and the assembly defines a portable stage.

4. The assembly of claim 1, wherein the corner block forms part of a section of staging platform.

5. The assembly of claim 1, wherein the locating plate includes at least one locating node.

6. The assembly of claim 1, wherein the locating plate, at least one locking node, and locking pin are comprised of steel and the locating plate is welded to the collar and at least one gusset plate.

7. The assembly of claim 1, wherein the locking node includes a tapered end configured to be inserted in the node receiving cavity.

8. The assembly of claim 1, wherein the node receiving cavity comprises a consistent circumference along the length of the cavity.

9. A system, comprising:
a platform comprising a frame around the perimeter of an infill panel, the frame including at least one corner block located at a corner of the platform under the infill panel, wherein the corner block includes a node receiving cavity having a cylindrical wall comprising an aperture extending therethrough and configured to receive a locking pin;
a locating plate assembly comprising:
a locating plate;
at least one locking node extending from an upper face of the locating plate, where the at least one locking node includes a spring-loaded locking pin extending from an outer surface thereof and configured to engage the aperture when the at least one locking node is inserted in the node receiving cavity, wherein the spring-loaded locking pin includes a release lever attached thereto; and
a collar coupled to a lower face of the locating plate and configured to receive an upper end of a support leg, the release lever downwardly extending through the locking node and the collar;
a support leg received within the collar and comprising a cylindrical member having an open channel defined by a circumferential surface comprising a second aperture extending therethrough, the support leg configured to engage the release lever in the second aperture when the at least one locking node is inserted in the node receiving cavity, wherein the release lever is activated by depressing the lever flush within the second aperture to release the locking node from the corner block; and
at least two braces coupled to the support leg and the platform.

10. The system of claim 9, wherein the at least two braces are orientated at about ninety degrees from each other on the support leg.

11. The system of claim 9, wherein the locating plate includes at least one locating node.

12. The system of claim 9, wherein a length of the support leg is adjustable.

13. The system of claim 9, wherein the frame includes a corner block under each corner of the platform and a support leg is attached to each corner block such that the platform is supported by the support legs.

14. The system of claim 13, wherein each of the support legs comprises:
an end proximate the platform and an opposing end; and
a caster attached to the opposing end.

15. The system of claim 13, wherein the system is portable when assembled.

16. The system of claim 9, wherein the node receiving cavity comprises a consistent circumference along the length of the cavity.

17. A method for assembling a portable stage, comprising:
positioning each of four support pieces at a respective corner of a first platform, each of the four support pieces comprising a support leg received within a collar extending from a lower face of a locating plate, the locating plate including at least one locking node and at least one locating node extending from an upper face thereof, the at least one locking node including a spring-loaded locking in extending from an outer surface thereof and being coupled to a release lever, the release lever downwardly projecting through the locking node and the collar,
wherein the support leg comprises a cylindrical member having an open channel defined by a circumferential surface comprising a first aperture extending therethrough, the first platform including a corner block at each corner, each corner block having a node receiving cavity having a cylindrical wall comprising a second aperture extending therethrough;
inserting a locking node of each of the locating plates into the locking node receiving cavity of the respective corner blocks, wherein upon insertion of the locking node the locking pin engages the second aperture in the locking node receiving cavity and the release lever engages the aperture in the circumferential surface of the support leg, wherein the release lever is activated by depressing the lever flush within the support leg aperture to release the locking node from the corner block; and
attaching a first end of at least two braces to each support leg and attaching a second end of each of the braces to the platform.

18. The method of claim 17, further comprising:
providing a second platform having a corner block at each corner, where each corner block includes a locking node receiving cavity;
positioning at least two corners of the second platform adjacent two corners of the first platform such that a respective locating node of the locating plates attached to the two corners of the first platform is inserted into the locking node receiving cavity of the respective corner blocks of the second platform;
positioning additional support pieces at respective unsupported corners of the second platform;
inserting a locking node of each of the additional support pieces into the locking node receiving cavity of the respective corner blocks, wherein upon insertion of the locking node the locking pin engages a second aperture in the locking node receiving cavity and the release lever engages the first aperture in the respective circumferential surfaces of the additional support legs; and
installing braces on the additional support pieces.

19. The method of claim 17, further comprising moving the assembled stage to a desired location.

* * * * *